US012043520B2

(12) United States Patent
Chen et al.

(10) Patent No.: US 12,043,520 B2
(45) Date of Patent: Jul. 23, 2024

(54) PASSENGER GUIDING SYSTEM FOR ELEVATOR, ELEVATOR SYSTEM AND PASSENGER GUIDING METHOD

(71) Applicant: Otis Elevator Company, Farmington, CT (US)

(72) Inventors: Hui Chen, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1478 days.

(21) Appl. No.: 16/405,273

(22) Filed: May 7, 2019

(65) Prior Publication Data

US 2019/0345001 A1 Nov. 14, 2019

(30) Foreign Application Priority Data

May 8, 2018 (CN) ........................ 201810431039.7

(51) Int. Cl.
*B66B 3/00* (2006.01)
*B66B 1/46* (2006.01)

(52) U.S. Cl.
CPC .............. *B66B 3/006* (2013.01); *B66B 1/468* (2013.01); *B66B 2201/405* (2013.01); *B66B 2201/4669* (2013.01)

(58) Field of Classification Search
CPC ............ B66B 1/468; B66B 2201/4615; B66B 1/3492; B66B 5/0012; B66B 2201/103;
(Continued)

(56) References Cited

U.S. PATENT DOCUMENTS 7,712,586 B2 5/2010 Legez
8,260,042 B2 9/2012 Peng et al.
(Continued)

FOREIGN PATENT DOCUMENTS

AU 2016277453 A1 * 1/2018 ............. B66B 1/468
CN 202116159 U 1/2012
(Continued)

OTHER PUBLICATIONS

Chinese Office Action for Application No. 201810431039.7; Issued Jan. 28, 2022; 9 Pages.
(Continued)

*Primary Examiner* — Marlon T Fletcher
(74) *Attorney, Agent, or Firm* — CANTOR COLBURN LLP

(57) ABSTRACT

A passenger guidance system, elevator system, and passenger guidance method for elevators. The passenger guidance system includes: a sensor, arranged to collect object feature data of a passenger going towards an elevator; a processing device, in communication with the sensor and an elevator system, for receiving the object feature data and comparing the object feature data with stored passenger information to learn information of a target floor of a successfully matched passenger, and learning a target elevator currently dispatched corresponding to the target floor according to elevator running information of the elevator system; and a guidance device, in communication with the processing device, for forming a sign to at least guide the successfully matched passenger to go towards the target elevator. The present invention can be applied to humanistically and intelligently guide the passenger to reach the target elevator, and bring good elevator taking experience to users.

18 Claims, 2 Drawing Sheets

(58) Field of Classification Search
CPC ......... B66B 3/002; B66B 1/3446; B66B 3/02; B66B 5/0006; B66B 3/006; B66B 2201/4638; B66B 2201/4676; B66B 2201/402; B66B 7/02; B66B 1/52; B66B 2201/104; B66B 2201/4607; B66B 7/043
See application file for complete search history.

(56) References Cited

U.S. PATENT DOCUMENTS

| | | | | |
|---|---|---|---|---|
| 9,862,567 | B2 | 1/2018 | Saari et al. | |
| 2015/0329316 | A1 | 11/2015 | Lee | |
| 2016/0214830 | A1 | 7/2016 | Simcik et al. | |
| 2016/0311646 | A1 | 10/2016 | Bryant et al. | |
| 2017/0001830 | A1 | 1/2017 | Mäkilaurila et al. | |
| 2017/0362054 | A1 | 12/2017 | Legeret et al. | |
| 2019/0023529 | A1* | 1/2019 | Lau | B66B 5/14 |
| 2019/0345001 | A1* | 11/2019 | Chen | B66B 3/006 |
| 2019/0389689 | A1* | 12/2019 | Jia | B66B 1/2458 |
| 2020/0239277 | A1* | 7/2020 | Larmuseau | H04W 4/024 |

FOREIGN PATENT DOCUMENTS

| | | | | | |
|---|---|---|---|---|---|
| CN | 102482050 | A | | 5/2012 | |
| CN | 105517932 | A | * | 4/2016 | B66B 1/468 |
| CN | 205397750 | U | | 7/2016 | |
| CN | 205527102 | U | | 8/2016 | |
| CN | 107628490 | A | | 1/2018 | |
| CN | 108455390 | B | * | 4/2022 | B66B 1/2408 |
| EP | 3075691 | A2 | * | 10/2016 | B66B 1/2408 |
| EP | 3075693 | A1 | * | 10/2016 | B66B 1/2408 |
| EP | 3075697 | A1 | * | 10/2016 | B66B 1/3461 |
| EP | 3075699 | A1 | * | 10/2016 | B66B 1/3461 |
| EP | 3076247 | A1 | * | 10/2016 | B66B 1/2408 |
| JP | 2017030918 | A | * | 2/2017 | B66B 1/14 |
| KR | 20120029903 | A | | 3/2012 | |
| KR | 20120111244 | A | | 10/2012 | |
| WO | WO-2015124826 | A1 | * | 8/2015 | B66B 3/002 |
| WO | 2017201695 | A1 | | 11/2017 | |

OTHER PUBLICATIONS

Fortune, James, "Elevator Destination Dispatching—A Revolution in the Making", CTBUH 2012 9th World Congress, Shanghai, 7 pages.

* cited by examiner

PASSENGER GUIDING SYSTEM FOR ELEVATOR, ELEVATOR SYSTEM AND PASSENGER GUIDING METHOD

FOREIGN PRIORITY

This application claims priority to Chinese Patent Application No. 201810431039.7, filed May 8, 2018, and all the benefits accruing therefrom under 35 U.S.C. § 119, the contents of which in its entirety are herein incorporated by reference.

TECHNICAL FIELD

The present invention relates to the technical field of elevators, and in particular, to a passenger guidance system, elevator system, and passenger guidance method for elevators.

BACKGROUND ART

Elevators have been widely used in the modern society, which bring great convenience to people's work and daily life. In the prior art, a large number of elevator devices, apparatuses, or systems of various types have been provided to meet people's different application needs. However, these existing elevator devices, apparatuses, or systems still have disadvantages and shortcomings in such aspects as intellectualization, humanization, aesthetics, and user experience, which can be further improved and optimized.

SUMMARY OF THE INVENTION

In view of the above, the present invention provides a passenger guidance system, an elevator system, and a passenger guidance method, thereby solving or at least relieving one or more of the above problems existing in the prior art and problems in other aspects.

First of all, according to a first aspect of the present invention, a passenger guidance system for elevators is provided. The passenger guidance system comprises: a sensor, arranged to collect object feature data of a passenger going towards an elevator; a processing device, in communication with the sensor and an elevator system, for receiving the object feature data and comparing the object feature data with stored passenger information to learn information of a target floor of a successfully matched passenger, and learning a target elevator currently dispatched corresponding to the target floor according to elevator running information of the elevator system; and a guidance device, in communication with the processing device, for forming a sign to at least guide the successfully matched passenger to go towards the target elevator.

In the passenger guidance system according to the present invention, optionally, the passenger guidance system further includes a region guiding device, arranged to form a region defined by the sign to guide the passenger to go towards the elevator within a range defined thereby, the region overlapping or being covered by a detection region of the sensor.

In the passenger guidance system according to the present invention, optionally, the processing device is further arranged to communicate with the region guiding device for controlling the output of the sign of the region guiding device.

In the passenger guidance system according to the present invention, optionally, the passenger information is stored in the processing device, or stored in a local server or a cloud server in communication with the processing device.

In the passenger guidance system according to the present invention, optionally, the object feature data of a passenger who has failed to be matched by comparison at this time and the information of the target floor selected to reach by the passenger at this time learnt according to the elevator running information are stored and added to the passenger information.

In the passenger guidance system according to the present invention, optionally, the sign of the guidance device comprises text, a pattern, or a combination thereof, and/or the sign of the region guiding device comprises text, a pattern, or a combination thereof.

In the passenger guidance system according to the present invention, optionally, the sign of the guidance device is projected to the ground and/or sidewall of a path through which the passenger goes towards the elevator, and/or the sign of the region guiding device is projected to the ground and/or sidewall of the hall.

In the passenger guidance system according to the present invention, optionally, the processing device is in communication with the sensor, the guidance device, and the region guiding device wirelessly.

In the passenger guidance system according to the present invention, optionally, the object feature comprises a face, a voice, a behavior trajectory, a height, and a body shape.

In the passenger guidance system according to the present invention, optionally, the sensor is one or more of an image sensor, a video sensor, an acoustic sensor, an infrared sensor, and a depth sensor, and one or more of the sensors are provided and are arranged on the top and/or sidewall of the path through which the passenger goes towards the elevator.

Next, according to a second aspect of the present invention, an elevator system is provided. The elevator system comprises the passenger guidance system according to any one of the above.

In addition, according to a third aspect of the present invention, a passenger guidance method is further provided. The passenger guidance method comprises the following steps: A. collecting object feature data of a passenger going towards an elevator; B. comparing the object feature data with stored passenger information to learn information of a target floor of a successfully matched passenger, and learning a target elevator currently dispatched corresponding to the target floor according to elevator running information; and C. forming a sign to at least guide the successfully matched passenger to go towards the target elevator.

In the passenger guidance method according to the present invention, optionally, the passenger guidance method further includes a region guiding step: forming a region defined by the sign to guide the passenger to go towards the elevator within a range defined thereby, the region overlapping or being covered by a detection region of the sensor.

In the passenger guidance method according to the present invention, optionally, the passenger information is stored locally or at a cloud end.

In the passenger guidance method according to the present invention, optionally, the passenger guidance method further comprises a storing step: storing and adding, to the passenger information, the object feature data of a passenger who has failed to be matched by comparison at this time and the information of the target floor selected to reach by the passenger at this time learnt according to the elevator running information.

In the passenger guidance method according to the present invention, optionally, the sign in the step C comprises text, a pattern, or a combination thereof, and/or the sign in the region guiding step comprises text, a pattern, or a combination thereof.

In the passenger guidance method according to the present invention, optionally, the sign in the step C is projected to the ground and/or sidewall of a path through which the passenger goes towards the elevator, and/or the sign in the region guiding step is projected to the ground and/or sidewall of the hall.

In the passenger guidance method according to the present invention, optionally, the object feature comprises a face, a voice, a behavior trajectory, a height, and a body shape.

In the passenger guidance method according to the present invention, optionally, one or more sensors are used in the step A to collect the object feature data, and the sensor is one or more of an image sensor, a video sensor, an acoustic sensor, an infrared sensor, and a depth sensor.

In the passenger guidance method according to the present invention, optionally, the sensor is arranged on the top and/or sidewall of the path through which the passenger goes towards the elevator.

Principles, characteristics, features, and advantages of the various technical solutions according to the present invention will be clearly understood in accordance with the following detailed description in conjunction with the accompanying drawings. For example, it will be clear that the passenger guidance system, elevator system and passenger guidance method provided according to the design of the present invention have obvious technical advantages compared with the prior art, which can quickly and accurately monitor and analyze a target elevator of passengers, and guide them to reach the target elevator humanistically and intelligently, thus greatly improving the user experience and providing the passengers with pleasure and comfort in taking elevators. The application of the present invention has low cost and strong practicability.

BRIEF DESCRIPTION OF THE DRAWINGS

Hereinafter, the technical solution of the present invention will be described in further detail with reference to the accompanying drawings and embodiments, but it should be noted that these accompanying drawings are designed for explanatory purposes only and are merely intended to conceptually illustrate the structure described herein, and thus the drawings do not need to be drawn to scale.

DETAILED DESCRIPTION

First of all, it should be noted that the structural composition, steps, features, advantages, and the like of the passenger guidance system, elevator system, and passenger guidance method for elevators according to the present invention will be illustrated in an exemplary way in the following, but no descriptions should be used to limit the present invention.

In addition, for any single technical feature described or implied in the embodiments referred to herein, or any single technical feature displayed or implied in each of the accompanying drawings, the present invention still allows arbitrary combinations or deletions between these technical features (or their equivalents) without any technical obstacles, such that more embodiments according to the present invention should also be considered to be within the disclosed scope of the disclosure. In addition, in order to simplify the figures, identical or similar parts and features may be labeled only at one or several places in the same figure.

Figure 1:
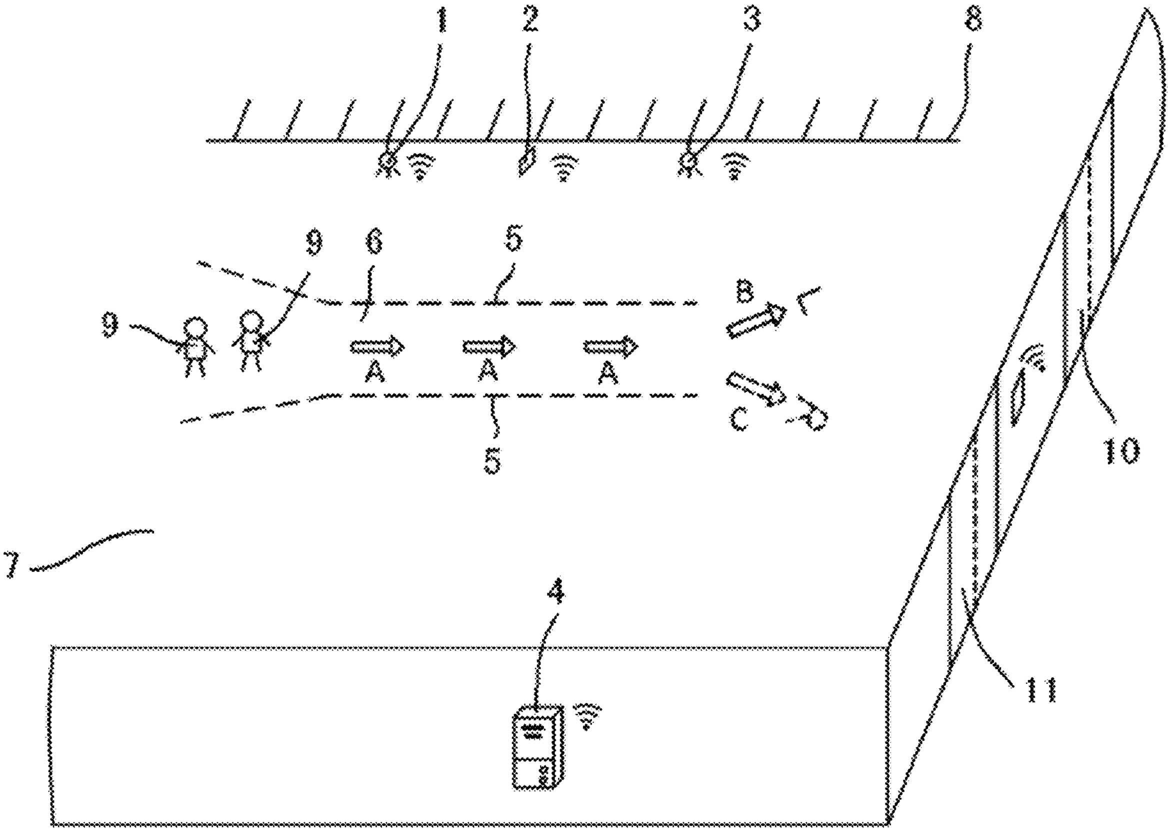
FIG. 1 is a schematic scene diagram of a passenger guidance system embodiment according to the present invention being arranged at a hall of an elevator.
Figure 2:
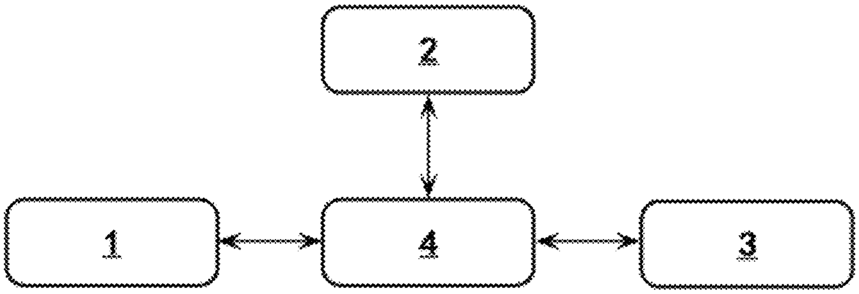
FIG. 2 is a schematic composition diagram of the passenger guidance system embodiment shown in FIG. 1.

FIG. 1 is a schematic scene diagram of a passenger guidance system embodiment according to the present invention being arranged at a hall of an elevator, and FIG. 2 further shows basic compositions of the passenger guidance system embodiment, i.e., a guiding device 1, a sensor 2, a guidance device 3, and a processing device 4 are provided in the passenger guidance system. The examples of the two figures will be referenced below to introduce the present invention.

In the given embodiment, a region guiding device 1 is configured to form a region 6 within a hall 7 leading to an elevator 10 or 11, wherein the region 6 can be formed by using any suitable components, devices, or apparatuses such as LEDs and laser components to project a sign 5 to the ground and/or sidewall or other locations of the hall 7 and the region 6 is formed to overlap a detection region of the sensor 2 or to be covered by the detection region, such that a passenger 9 can be intuitively and effectively guided to go, in a range defined by the region 6, towards the elevators 10 and 11 in the direction shown by the arrow A (these arrows A may be a part of the above-mentioned sign 5) as shown in FIG. 1, i.e., the passenger 9 is in the detection region of the sensor 2 at this time. Therefore, the travelling passenger 9 can be captured by the sensor 2 very accurately and quickly and corresponding information of object feature data can be collected thereby.

The present inventor has found upon study that, in the prior art, physical doors or fences are usually arranged at exits and other locations of building halls to restrict passengers to go along a given passage, so as to collect information of these passengers through an information detection apparatus arranged at the passage, and use the collected data for elevator dispatching arrangement, etc. However, the above-mentioned approach will restrict passengers to a certain extent and affect the user experience, and arranging physical doors or fences and other devices not only occupies a space, but also affects the aesthetics. By contrast, by means of using the sign 5 by the region guiding device 1 to provide the region 6 mentioned above according to the present invention can effectively overcome the above defects and shortcomings in the prior art, thereby bringing very good user experience to the passengers, and providing them with pleasure and comfort in taking elevators.

As mentioned above, the sensor 2 is arranged to collect the object feature data of the passenger 9 going through the hall 7 to the elevator. Such object feature data includes, but is not limited to, a face, a voice, a behavior trajectory, a height, and a body shape, and such object feature data can be used to analyze and confirm identity information or the like of the passenger 9. As an example, the sensor 2 may be one or more of an image sensor, a video sensor, an acoustic sensor, an infrared sensor, and a depth sensor. Without departing from the gist of the present invention, the present invention allows to use one or more sensors 2, and the sensors 2 can be arranged on the top 8 of the hall 7, the sidewall of the hall 7, or any other suitable locations according to practical applications, so as to form a desired detection coverage range within the hall 7.

The processing device 4 is in communication with the sensor 2, and is used for receiving the object feature data of the passenger 9 collected by the sensor 2, and comparing the object feature data with stored passenger information to learn information of respective target floors of one or more matched passengers. Usually, object feature data (such as faces, voices, behavior trajectories, heights, body shapes, etc.) of residents, staffs, and others in the building, and information of their routine access floors (such as information of residents' home floors, information of staffs' office floor), and so on can be stored in the processing device 4 as the passenger information mentioned above, or can also be stored in a local server or a cloud server in communication with the processing device 4 as the passenger information mentioned above.

In addition, the processing device 4 further communicates with an elevator system, such that elevator running information can be obtained from the elevator system. Through such elevator running information, the processing device 4 can learn a target elevator currently dispatched corresponding to the information of respective target floors of one or more successfully matched passengers, so as to quickly, accurately, and conveniently select and confirm a matched target elevator for this or these passengers to take.

In the given passenger guidance system embodiment, a guidance device 3 in communication with the processing device 4 is further provided. The guidance device 3 can obtain, from the processing device 4, information including respective target floors of the passengers and the matched target elevators, and then guide this or these successfully matched passengers to respectively go to the correspondingly dispatched matched target elevator by forming a sign in the hall 7. For example, FIG. 1 schematically shows that, for example, after analyzing and comparing the object feature data of the passenger 9, it is confirmed that the passenger 9 should preferentially choose to take the elevator 10 instead of the elevator 11, and then according to the processing result, an arrow B and a character "L" on the ground of the hall 7 can be lightened by the guide device 3, or the arrow B and the character "L" can be projected directly onto the ground (at this time, an arrow C and a character "R" used to guide the passenger to the other elevator 11 are not lightened or projected), so that the passenger 9 is informed and guided to travel and reach the elevator 10 so as to be transported to the target floor by taking the elevator 10 as soon as possible, thereby avoiding a long time consumed by undesirably choosing to wait at the elevator 11.

In addition, for some passengers failing to be successfully matched, this is possibly because they are not recorded in the stored passenger information (for example, this is the first time they enter the building), but they may be guided to the target elevator together because they are in company with the successfully matched passengers (such as friends, colleagues, family members, etc.), thus being transported to the target floor together with the successfully matched passenger at the same time. Additionally, for some passengers failing to be successfully matched, they may also be attracted by the sign formed in the hall 7 by the guidance device 3 and guided to the target elevator mentioned above. On the one hand, these passengers may be loaded into the car of the target elevator and then select the floor to reach by operating elevator buttons. On the other hand, these passengers may also choose another elevator when finding that it is already in place while waiting for the target elevator.

The sign output by the region guiding device 1 and the sign output by the guidance device 3 may both include text (for example, reminding passengers to travel within the region defined by the sign, passenger names, passenger names and target floors, welcome words for certain passengers, advertisements, etc.), patterns (for example, straight lines, curves, decorative patterns, pedestrian zebra stripes, etc.), or a combination thereof. Without departing from the gist of the present invention, these signs can all be selected, changed, and adjusted according to the application needs. For example, the output of the above-mentioned signs can be flexibly selected and customized by communicating with the region guiding device 1 and the guidance device 3 respectively through the processing device 4. It not only has low cost and flexible control, but also can bring pleasure in taking elevators to the passengers and improve their comfort and riding experience.

By referring to the passenger guidance system examples shown in FIGS. 1 and 2, the general composition, working principle, and technical advantages of the passenger guidance system embodiment according to the present invention have been described in detail above, but it must be noted that the present invention allows various possible flexible designs, changes, and adjustments according to practical applications without departing from the gist of the present invention.

For example, although the region guiding device 1 is illustrated in the above-mentioned embodiments, in some embodiments, the region guiding device 1 may not be arranged; instead, the detection region formed by the sensor 2 can be directly arranged to cover the hall 7, such that the object feature data of the passenger 9 going towards the elevator through the hall 7 can be collected.

For another example, what is discussed in the preceding text is the utilization of the passenger information stored locally (such as the processing device 4 or a local server in communication with the processing device 4) or at a cloud end. However, it should be noted that, in some embodiments, the object feature data of a passenger who has failed to be matched by comparison at this time and the information of the target floor selected to reach by the passenger at this time learnt according to the elevator running information may be stored and added to the above-mentioned passenger information, so as to form a more complete passenger information record, which can facilitate the use of the updated and supplemented information in the future, thereby providing passengers with better service experience.

In addition, in the given examples, the guiding device 1, the sensor 2, and the guidance device 3 are demonstratively installed on the top 8 of the hall 7. However, it should be understood that, without departing from the gist of the present invention, the present invention allows to flexibly arrange the guiding device 1, the sensor 2, and the guidance device 3 with their respective disposed positions, the arranged amount thereof, models, working powers, etc. according to practical applications. For example, the guiding device 1, the sensor 2, and the guidance device 3 can be arranged on the path through which passengers go towards the elevator, instead of being limited to the arrangement in the hall 7 as discussed in the example above.

In addition, in some optional embodiments, consideration may be given to a hidden arrangement of the processing device 4 (for example, at a corner location of the hall 7) in order to improve aesthetics and ensure apparatus information security. Although the communication connection between the processing device 4 and the region guiding device 1, the sensor 2, the guidance device 3, and the elevator system can be implemented in a wireless manner, the communication connection between the processing device 4 and any of the above devices or systems can also be implemented in a wired manner.

Moreover, in an optional situation, the sign of the region guiding device 1 and/or the sign of the guidance device 3 may also be projected onto the floor, side wall, or any other suitable locations of the path (for example, the hall 7) through which the passengers go towards the elevator.

According to another technical solution of the present invention, an elevator system is further provided. The elevator system is configured with the passenger guidance system designed and provided according to the present invention, thereby fulfilling these obvious technical advantages as mentioned in the preceding possessed by the solution of the present invention compared with the prior art.

Figure 3:
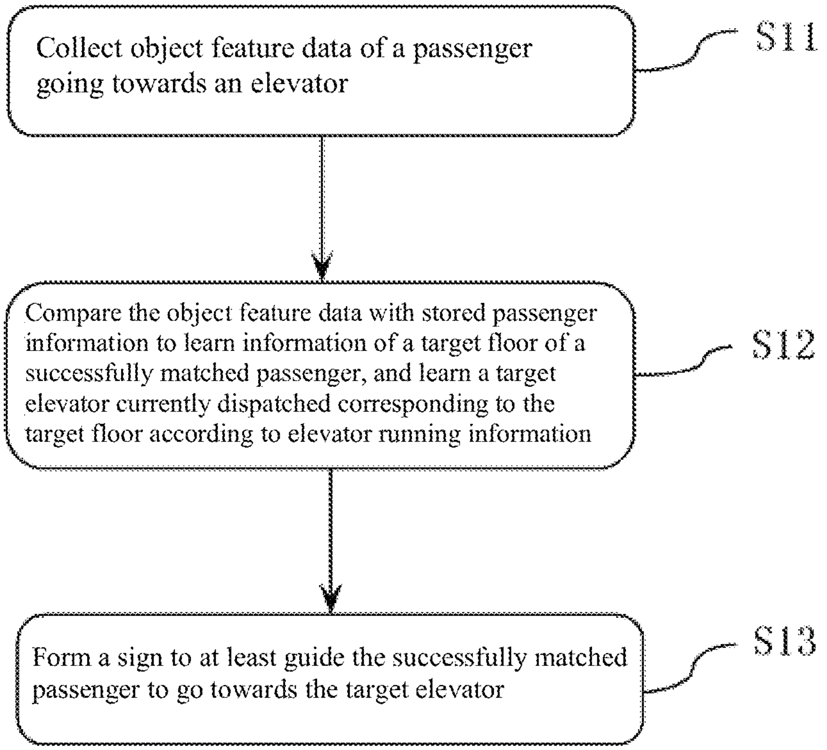
FIG. 3 is a flow chart of a passenger guidance method embodiment according to the present invention.

In addition, as one aspect that is obviously superior to the prior art, the present invention further provides a passenger guidance method. It is exemplified that, as shown in FIG. 3, the following steps may be included in a passenger guidance method example.

First, in step S11, for passengers going towards an elevator, object feature data (such as a face, a voice, a behavior trajectory, a height, and a body shape) of the passenger or the passengers is collected. For example, according to practical application needs, one or more sensors (for example, one or more of an image sensor, a video sensor, an acoustic sensor, an infrared sensor, and a depth sensor) may be used to collect the above-mentioned object feature data, and such sensors may be arranged on the top, sidewall, or any other suitable locations of the path (for example, the hall) through which the passengers go towards the elevator, so as to form the desired detection coverage range within the path.

Next, in step S12, the collected object feature data is compared with stored passenger information, to learn information of a target floor of a successfully matched passenger, and a target elevator currently dispatched corresponding to the target floor of the successfully matched passenger is learnt according to elevator running information (which can, for example, be obtained from the elevator system).

Then, in step S13, the successfully matched passenger may be at least guided to the target elevator by, for example, forming a sign in the hall. As stated above, some passengers failing to be successfully matched may be guided to the target elevator together because they are in company with the successfully matched passengers (such as friends, colleagues, family members, etc.), thus being transported to the target floor together with the successfully matched passenger at the same time. Of course, for some passengers failing to be successfully matched, they may also be attracted by the sign formed in the hall and guided to the above-mentioned target elevator. These passengers may be loaded into the car of the target elevator and then select the floor to reach by operating elevator buttons, and may also choose another elevator when finding that it is already in place while waiting for the target elevator.

In some embodiments according to the method of the present invention, the passengers may also be guided by forming a region overlapping or being covered by the detection region of the sensor on the path (for example, the hall) through which the passengers go towards the elevator, and such a region can be defined by the sign to guide the passengers to travel in a range defined thereby. In this way, the passengers are enabled to travel within the detection region of the sensor, such that the sensor can capture and collect the object feature data of the passengers very accurately and quickly.

Furthermore, in an optional situation, the above-mentioned passenger information may be stored locally or at a cloud end. In some optional embodiments, the method of the present invention may also store and add, to the above-mentioned passenger information, the object feature data of a passenger who has failed to be matched by comparison at this time and the information of the target floor selected to reach by the passenger at this time learnt according to the elevator running information, so as to form a more complete passenger information record, which facilitates the future use of these pieces of information, thereby providing passengers with better service experience.

In addition, it can be understood that, the technical content such as collection and processing of the sign, the sensor, and the object feature data and comparison and storage of the passenger information have been described in detail when illustrating the passenger guidance system in the preceding; therefore, reference can be directly made to the detailed illustration of the preceding corresponding parts, which will not be described herein.

The passenger guidance system, elevator system, and passenger guidance method for elevators according to the present invention are described in detail merely by using examples, and these examples are only used for illustrating the principles and implementations of the present invention, not for limiting the present invention. Various modifications and improvements can also be made by persons skilled in the art without departing from the spirit and scope of the present invention. Therefore, all the equivalent technical solutions should fall within the scope of the present invention and be defined by the claims of the present invention.

What is claimed is:

1. A passenger guidance system for elevators, wherein the passenger guidance system comprises:

a sensor, arranged to collect object feature data of a passenger going towards an elevator;

a processing device, in communication with the sensor and an elevator system, for receiving the object feature data and comparing the object feature data with stored passenger information to learn information of a target floor of a successfully matched passenger, and learning a target elevator currently dispatched corresponding to the target floor according to elevator running information of the elevator system;

a guidance device, in communication with the processing device, for forming a sign to at least guide the successfully matched passenger to go towards the target elevator;

a region guiding device, arranged to form and project a region to visually guide the passenger to go towards the elevator within a range of the region;

wherein the region overlaps or is covered by a detection region of the sensor.

2. The passenger guidance system according to claim 1, wherein the processing device is further arranged to communicate with the region guiding device, to control the output of the sign of the region guiding device.

3. The passenger guidance system according to claim 1, wherein the passenger information is stored in the processing device, or stored in a local server or a cloud server in communication with the processing device.

4. The passenger guidance system according to claim 1, wherein the object feature data of a passenger who has failed to be matched by comparison at this time and the information of the target floor selected to reach by the passenger at this time learnt according to the elevator running information are stored and added to the passenger information.

5. The passenger guidance system according to claim 1, wherein the sign of the guidance device comprises text, a pattern, or a combination thereof, and/or the sign of the region guiding device comprises text, a pattern, or a combination thereof.

6. The passenger guidance system according to claim 1, wherein the sign of the guidance device is projected to the ground and/or sidewall of a path through which the passenger goes towards the elevator, and/or the sign of the region guiding device is projected to the ground and/or sidewall of the hall.

7. The passenger guidance system according to claim 1, wherein the processing device is in communication with the sensor, the guidance device, and the region guiding device wirelessly.

8. The passenger guidance system according to claim 1, wherein the object feature comprises a face, a voice, a behavior trajectory, a height, and a body shape.

9. The passenger guidance system according to claim 1, wherein the sensor is one or more of an image sensor, a video sensor, an acoustic sensor, an infrared sensor, and a depth sensor, and one or more of the sensors are provided and arranged on the top and/or sidewall of the path through which the passenger goes towards the elevator.

10. An elevator system, wherein the elevator system comprises the passenger guidance system according to claim 1.

11. A passenger guidance method, wherein the passenger guidance method comprises:

collecting, via a sensor, object feature data of a passenger going towards an elevator;

comparing the object feature data with stored passenger information to learn information of a target floor of a successfully matched passenger, and learning a target elevator currently dispatched corresponding to the target floor according to elevator running information;

forming a sign to at least guide the successfully matched passenger to go towards the target elevator;

forming and projecting a region to visually guide the passenger to go towards the elevator within a range of the region;

wherein the region overlaps or is covered by a detection region of the sensor.

12. The passenger guidance method according to claim 11, wherein the passenger information is stored locally or at a cloud end.

13. The passenger guidance method according to claim 11, wherein the passenger guidance method further comprises: storing and adding, to the passenger information, the object feature data of a passenger who has failed to be matched by comparison at this time and the information of the target floor selected to reach by the passenger at this time learnt according to the elevator running information.

14. The passenger guidance method according to claim 11, wherein the sign in the step C comprises text, a pattern, or a combination thereof.

15. The passenger guidance method according to claim 11, wherein the sign is projected to the ground and/or sidewall of a path through which the passenger goes towards the elevator.

16. The passenger guidance method according to claim 11, wherein the object feature comprises a face, a voice, a behavior trajectory, a height, and a body shape.

17. The passenger guidance method according to claim 11, wherein one or more sensors are used to collect the object feature data, and the sensor is one or more of an image sensor, a video sensor, an acoustic sensor, an infrared sensor, and a depth sensor.

18. The passenger guidance method according to claim 17, wherein the sensor is arranged on the top and/or sidewall of the path through which the passenger goes towards the elevator.

* * * * *